United States Patent [19]

Demopoulos et al.

[11] Patent Number: 4,541,861

[45] Date of Patent: Sep. 17, 1985

[54] PROCESS FOR THE PRODUCTION OF COBALT, NICKEL AND COPPER POWDERS FROM CHELATING EXTRACTANTS

[75] Inventors: George P. Demopoulos, Montreal; Philip A. Distin, Pointe Claire, both of Canada

[73] Assignee: The Royal Institution for the Advancement of Learning (McGill University), Montreal, Canada

[21] Appl. No.: 650,211

[22] Filed: Sep. 13, 1984

[51] Int. Cl.[4] .................. C22B 15/12; C22B 23/04
[52] U.S. Cl. ........................ 75/0.5 A; 75/0.5 AA; 75/117; 75/119
[58] Field of Search .............. 75/0.5 A, 0.5 AA, 117, 75/119

[56] References Cited

U.S. PATENT DOCUMENTS

| | | | |
|---|---|---|---|
| 3,532,490 | 10/1970 | Burkin | 75/5 |
| 3,637,711 | 1/1972 | Budde, Jr. et al. | 260/289 |
| 3,701,650 | 10/1972 | van der Zeeuw | 75/0.5 A |
| 3,725,046 | 4/1973 | Hartlage et al. | 75/101 BE |
| 3,820,979 | 6/1974 | Manassen | 75/0.5 A |
| 3,844,763 | 10/1974 | Burkin | 75/0.5 A |
| 4,032,331 | 6/1977 | Gerlach | 75/0.5 A |

FOREIGN PATENT DOCUMENTS 1267586  3/1972  United Kingdom .

OTHER PUBLICATIONS

Burkin et al. Proceedings of the First Annual Meeting of Canadian Hydrometallurgists, Oct. 28–29, 1971, pp. 51–62.
Burkin, A. R., Proceedings of the Richardson Conference: "Physical Chemistry of Process Metallurgy", published by the Institution of Mining and Metallurgy, London, England, pp. 43–47.
Burkin, A. R. Proceedings of Royal Society, London, England, A 338, pp. 419–437, (1974).
Demopoulos, G. and Distin, P. A., Proceedings of the International Solvent Extraction Conference, Sep. 1980, Liege, Belgium.
Demopoulos, G. and Distin P. A., J. Chem. Tech. Biotechnol., 1983, 33A, pp. 249–260.

*Primary Examiner*—Wayland Stallard
*Attorney, Agent, or Firm*—Schwartz, Jeffery, Schwaab, Mack, Blumenthal & Evans

[57] ABSTRACT

Cobalt, nickel and copper powders are produced from chelating extractants by reacting with hydrogen a liquid organic medium containing in solution a quinoline-based chelating extractant having bonded thereto a metal selected from the group consisting of cobalt, nickel and copper, and a hydrogenation inhibitor consisting of a linear or branched aliphatic alcohol containing from 7 to 13 carbon atoms, at a temperature of about 150° to about 350° C. and a pressure of about 50 to about 600 p.s.i. to cause precipitation of the metal in powder form while preventing decomposition of the chelating extractant, the liquid organic medium further containing a seed of the precipitating metal whereby to avoid undesirable deposition of the metal in plated form. The metal precipitates stoichiometrically with simultaneous regeneration of the chelating extractant which can thus be recycled for reloading with the metal to be precipitated. Since the metal is precipitated directly from the liquid organic medium, the process of the invention avoids electrowinning and therefore saves on energy, in addition to producing a product of high purity.

20 Claims, No Drawings

PROCESS FOR THE PRODUCTION OF COBALT, NICKEL AND COPPER POWDERS FROM CHELATING EXTRACTANTS

The present invention relates to improvements in the recovery of metal values from organic extractants. More particularly, the invention is concerned with a process for the production of cobalt, nickel and copper powders from chelating extractants.

Typically, conventional hydrometallurgical extraction processes for cobalt, nickel and copper recovery involve solvent extraction followed by electrowinning to recover metal from purified and concentrated aqueous solutions. An impure aqueous solution containing the desired metal values in ionic form and obtained from the leaching of ores, concentrates or wastes is intimately contacted with a water-immiscible hydrocarbon diluent containing a metal ion collector or extractant dissolved therein, whereby the metal ions are readily extracted into the organic phase to provide a loaded organic medium. This loaded organic medium is then treated with an aqueous solution of a stripping agent (e.g., sulfuric acid) so as to regenerate the extracted metal values in ionic form and to effect the transfer thereof to a new aqueous phase, thereby providing a purified and relatively concentrated aqueous solution of the desired metal which serves as electrolyte in the subsequent electrowinning. An aqueous/organic phase separation follows the stripping step and, after this separation, small amounts of organic medium usually remain trapped in the electrolyte, leading to a powdery, impure metal product which adheres poorly to the cathodes used in the electrowinning.

Cobalt is very difficult to strip into an electrolyte for electrowinning. Successful stripping requires an electrolyte with an acidity so high that hazardous working conditions are created through ejection of acid droplets into the atmosphere by oxygen evolved during the electrowinning reaction. Corrosion problems also result from such extreme acidity. Moreover, nickel/cobalt separation when both co-exist in leach solutions (a common situation) is difficult due to the chemical similarity of these metals.

Pure copper is used mainly for electrical applications. However, the electrical conductivity of electrowon copper is reduced due to contamination by lead, which comes from the anodes used in present electrowinning processes.

The concept of combining stripping and metal recovery into a single step by reacting the loaded organic medium with hydrogen has been suggested previously (Burkin, U.S. Pat. No. 3,532,490; Van Der Zeeuw, British Pat. No. 1,267,586) for certain non-chelating extractants. In particular, these earlier patents describe hydrogen stripping of carboxylic acid and alkyl-phosphoric acid extractants to cause metal precipitation, these extractants having been found stable under the high temperature and pressure conditions applied. However, the earlier work with acidic-type extractants and hydrogen was discontinued partly due to extensive plating of the precipitating metal on the metallic surfaces within the autoclave.

Chelating extractants are known to be superior to acidic-type extractants and presently dominate the base-metal extraction industry. Research into hydrogen stripping of commercially available chelating extractants such as KELEX 100 (trade mark; Sherex Chemical Co., Ltd.), which is an alkylated derivative of 8-hydroxyquinoline, has been inhibited by the expectation that there would be destructive hydrogenation of the quinoline rings in the structure thereof. Indeed, it has been reported by workers in the field that extractants of the chelating type with easily reducible groups are unsuitable for direct reduction with hydrogen since they are not sufficiently stable to withstand the conditions required to reduce complexes between them and metals such as copper, nickel and cobalt (Burkin, A.R. and Burgess, J.E.A., Proceedings of the First Annual Meeting of Canadian Hydrometallurgists, Oct. 28-29, 1971 pp. 51-62, at page 59; Burkin, A.R., Proceedings of the Richardson Conference: Physical Chemistry of Process Metallurgy, July 1973, published by The Institution of Mining and Metallurgy, London, England, pp. 43-47, at page 44; Burkin, A.R., Proceedings of Royal Society, London, England, A 338, pp. 419-437 (1974), at page 427). This destructive hydrogenation is promoted by the tendency of freshly precipitated metals to act as hydrogenation catalysts by changing relatively unreactive molecular hydrogen to a highly activated form.

It is therefore an object of the present invention to overcome the aforementioned drawbacks and to provide a process for the production of cobalt, nickel and copper powders from quinoline-based chelating extractants using hydrogen, without causing decomposition of the chelating extractant and undesirable deposition of the metal in plated form.

In accordance with the invention, there is thus provided a process for the production of cobalt, nickel and copper powders from chelating extractants, which comprises reacting with hydrogen a liquid organic medium containing in solution a quinoline-based chelating extractant having bonded thereto a metal selected from the group consisting of cobalt, nickel and copper, and a hydrogenation inhibitor consisting of a linear or branched aliphatic alcohol containing from 7 to 13 carbon atoms, at a temperature of about 150° to about 350° C. and a pressure of about 50 to about 600 p.s.i. to cause precipitation of the metal in powder form while preventing decomposition of the chelating extractant, the liquid organic medium further containing a seed of the precipitating metal whereby to avoid undesirable deposition of the metal in plated form.

Applicants have already reported that the commercial extractant KELEX 100 loaded with copper could be reacted with hydrogen to precipitate copper with no apparent organic decomposition, using decanol as a modifier in the organic diluent similarly as in conventional systems involving acid stripping, since the liquid organic samples had to be stripped prior to chemical analysis by atomic absorption spectrophotometry (Demopoulos, G. and Distin, P.A., Proceedings of the International Solvent Extraction Conference, September 1980, Liège, Belgium). The purpose of a modifier in conventional solvent extraction systems is to improve phase separation between the aqueous and organic phases and its importance has been discussed in U.S. Pat. No. 3,725,046. Since applicants later found that the liquid organic samples could be analysed directly without prior acid stripping such that no aqueous/organic phase separation would be required and in order to have a more simple system (that is, a two-component system: loaded extractant and organic diluent), the decanol was removed. Degradation problems were then experienced as evidenced from the following signs: (a) enhanced copper precipitation rates, (b) an adherent copper film on the glass liner in addition to the plating of internal metallic surfaces of the autoclave, (c) the copper powder was brown with an increased amount of carbon impurity ($\simeq 1\%$ w/w) and was more than 30% w/w of submicron size, this being much finer than that of a "normal" reduction run, and (d) during subsequent reloading of the affected solvent, a third phase was formed presumably due to degradation products.

Factors responsible for the degradation observed were investigated, among which were: impurities present in the organic extractant, water entrainment in the organic medium, traces of oxygen from the gaseous atmosphere, and traces of cleaning agent (e.g. nitric acid) used to clean the autoclave. None of these was found to be responsible. The decanol conventionally used as modifier was then put back into the system and no degradation signs were observed. Applicants thereafter found that the product which underwent degradation was the organic extractant itself; the particular alcohol tested, i.e. decanol, would thus seem to act as a hydrogenation inhibitor to prevent decomposition of the quinoline-based chelating extractant KELEX 100.

The hydrogenation inhibiting effect that decanol has on KELEX 100 in the case of copper precipitation has been discussed by Applicants in J. Chem. Tech. Biotechnol., 1983, 33A, pp. 249–260. However, such effect with respect to cobalt and nickel which are regarded as strong hydrogenation catalyst was still to be investigated, as well as the applicability of other alcohols. The problem of plating still had to be solved, and the optimum temperature and pressure conditions for metal precipitation by hydrogen reduction had yet to be determined.

Applicants have now found, in accordance with the present invention, that aliphatic alcohols with carbon chains of $C_7$ to $C_{13}$ can be successfully used as hydrogenation inhibitors for copper, cobalt and nickel precipitation from quinoline-based chelating extractants such as KELEX 100. It is believed that this specific class of alcohols retards the catalytic effect of freshly produced metal in hydrogenating the quinoline ring.

With respect to the other problem encountered, that is, plating of the interior surface of the autoclave, this was overcome by adding a seed of the precipitating metal. Indeed, Applicants have unexpectedly found that by using a seed of the precipitating metal together with the quinoline-based chelating extractant, there was essentially no plating of the metal on the surface of the autoclave. It is believed that this, in contrast to carboxylic acid type extractants, reflects differences in the strength of bonding present in chelating and non-chelating agents so that in the process of the present invention which employs a chelating agent where strong bonding exists the seed provides a sufficiently active surface to break the metal-chelate bond, whereas the autoclave surface does not. Thus, the seed is the only surface in the system to catalyze metal precipitation, thereby preventing undesirable plating.

The quinoline-based chelating extractants suitable for carrying out the process of the invention are preferably hydrocarbyl-substituted 8-hydroxyquinolines having the general formula:

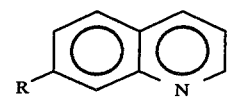

wherein R is a hydrocarbyl group such as alkyl, alkenyl, cycloalkyl or aryl, having from 8 to 17 carbon atoms. These compounds and their preparation are described in U.S. Pat. No. 3,637,711. A particularly preferred extractant is the commercially available KELEX 100. Analysis of a typical KELEX 100 sample of recent manufacture by gas chromatography-mass spectrometry showed that the active component of the extractant is 7-(4-ethyl-1-methyloctyl)-8-hydroxyquinoline, having the formula:

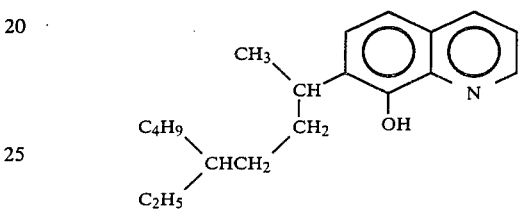

The active component accounts for approximately 80–82% (w/w) while the balance is made up of various by-products of the manufacture. It is also possible to use an alkaryl sulphonamido quinoline such as sold under the trade mark LIX 34 by Henkel Corp. The extractant is generally used in an amount of about 5 to about 30% by volume, preferably about 15% by volume, based on the total volume of the liquid organic medium.

The liquid organic medium generally comprises a hydrocarbon diluent in which the chelating extractant is soluble. The diluent can be selected among the aliphatic, cycloaliphatic and aromatic hydrocarbons derived from petroleum sources, such as toluene, xylene, kerosene, various high flash naphtha cuts and the like, as well as halogeno-hydrocarbons (e.g. 1,2-dichloroethane). A particularly preferred diluent is a low-vapour pressure kerosene having an aromatic content of less than 1%.

The aliphatic alcohol which acts as hydrogenation inhibitor is preferably used in an amount of about 5 to about 20% by volume, most preferably about 10% by volume, based on the total volume of the liquid organic medium. Examples of suitable hydrogenation inhibiting alcohols include octanol, nonanol, decanol and tridecanol, decanol being particularly preferred.

With respect to the operating temperature and pressure conditions, it has been found that for copper precipitation the reaction is best performed at a temperature between 170° and 215° C. and a hydrogen pressure between 50 and 600 p.s.i. It should be noted in this respect that KELEX 100 is preferred to LIX 34 since at 200° C. (as preferred for the copper-KELEX 100 chelate) hydrogen reacts with the sulfur atom in LIX 34 giving $H_2S$. A maximum temperature of about 175° C. can be used with LIX 34, at which copper precipitation rate is slow.

In the case of cobalt, the reaction is best carried out at a temperature between 250° and 350° C. and a hydrogen pressure between 100 and 600 p.s.i. On the other hand, the optimum temperature and pressure conditions for nickel precipitation are 230°–300° C. and 100–600 p.s.i.

In addition to copper, cobalt or nickel precipitation when only one of these metals is present, the process of the invention can be integrated into a scheme for separating cobalt and nickel when both are loaded into the chelating extractant. This method relies on the presence of dissolved cobalt as trivalent ion, which requires a much higher acidity for conventional acid stripping than divalent dissolved nickel. Nickel is first acid stripped, leaving cobalt in the organic phase for subsequent removal by hydrogen stripping. Thus, in addition to providing a means for cobalt/nickel separation, cobalt recovery by hydrogen stripping overcomes the well known difficulty of acid stripping cobalt from chelating extractants, a problem that can be only partially solved at present by precipitating cobalt sulphide using hydrogen sulphide. The invention therefore permits a commercially feasible and quantitative recovery of cobalt in metal form.

Copper, cobalt and nickel were found to precipitate stoichiometrically with simultaneous regeneration of the chelating extractant. The latter can therefore be readily recycled after reaction with hydrogen for reloading same with the metal to be precipitated.

Since the metal is precipitated directly from the liquid organic medium, the process of the invention avoids electrowinning and thus saves on energy, in addition to producing a product of high purity. Finally, by using hydrogen as a stripping agent for the quinoline-based chelating extractant, the acid pick-up problem encountered with conventional acid stripping of this type of extractant is avoided.

The following non-limiting examples illustrated the invention:

EXAMPLE 1

Shows preferred conditions for cobalt precipitation

Stage 1.

Two stagewise additions each of 1,000 cc of a 3.8 g/l cobalt (as cobaltous sulphate) solution are mixed, after pH adjustment with ammonium hydroxide, with 1,000 cc of 15 volume % KELEX 100, 10 volumme % decanol and 75 volume % kerosene to give a loaded organic medium containing 6.2 g/l cobalt.

Stage 2.

3 g of 5 μm cobalt powder is added as seed to the loaded organic medium produced in stage 1. The mixture is stirred and heated under nitrogen in an autoclave, then reacted for 3 hours at 300° C. with 300 p.s.i. hydrogen, followed by cooling under nitrogen. After reaction, 93.5% of the cobalt is precipitated as free powder with negligible plating on internal autoclave surfaces. The carbon content of the cobalt powder is 0.16%, and reloading of the hydrogen stripped organic medium according to stage 1 produces a 6.4 g/l cobalt solution.

EXAMPLE 2

Shows preferred conditions for nickel precipitation

Stage 1.

The procedure of Example 1, stage 1 is followed except that the organic medium is loaded from 6.3 g/l nickel (as sulphate) solution to give 11.4 g/l nickel in the organic medium.

Stage 2.

5 g of 4 μm nickel powder is added as seed to the loaded organic medium produced in stage 1. The mixture is stirred and heated under nitrogen in an autoclave, then reacted for 3 hours at 250° C. with 200 p.s.i. hydrogen, followed by cooling under nitrogen. After reaction, 96.0% of the nickel is precipitated as free powder with negligible plating on internal autoclave surfaces. The carbon content of the nickel powder is 0.11%, and reloading of the hydrogen stripped organic medium according to stage 1 produces a 11.1 g/l nickel solution.

EXAMPLE 3

Shows ability to repeatedly recycle the extractant

Stages 1 and 2 of Example 2 are repeated 20 times recycling the same extractant except that 2 volume % is replaced with fresh organic medium for each recycle to compensate for sampling and handling losses. For the last recycle, stage 1 loading gives a 11.6 g/l nickel solution, while stage 2 gives 94.2% of the nickel as free powder with a carbon content of 0.15%.

EXAMPLE 4

Shows nickel/cobalt separation

Stage 1.

The procedures of Example 1, stage 1, and Example 2, stage 1 are followed giving cobalt loaded and nickel loaded organic samples respectively. 500 cc of each sample are mixed to give an organic medium containing 3.1 g/l cobalt and 5.6 g/l nickel.

Stage 2.

The organic medium prepared in stage 1 is acid stripped using 2 stagewise additions each of 500 cc of 200 g/l sulphuric acid solution. The nickel is acid stripped quantitatively, as is 2.5% of the cobalt.

Stage 3.

The cobalt loaded organic phase remaining after stage 2 is reacted according to Example 1, stage 2. After reaction, 92.5% of the cobalt in the organic feed to stage 3 is precipitated as free powder with nickel and carbon contents of 0.15% and 0.18% respectively.

EXAMPLE 5

Shows preferred conditions for copper precipitation

Stage 1.

The procedure of Example 1, stage 1 is followed except that the organic medium is loaded from 2 stagewise additions each of 600 cc of a 10.0 g/l copper (as sulphate) solution to give 10.0 g/l copper in the organic medium.

Stage 2.

10 g of 4 μm copper powder is added as seed to the loaded organic medium produced in stage 1. The mixture is stirred and heated under nitrogen in an autoclave, then reacted for 1 hour at 200° C. with 400 p.s.i. hydrogen, followed by cooling under nitrogen. After reaction, 97.0% of the copper is precipitated as free powder with negligible plating on internal autoclave surfaces. The carbon content of the copper powder is 0.19%, and reloading of the hydrogen stripped organic medium according to stage 1 produces a 10.2 g/l copper solution.

EXAMPLE 6

Shows preferred conditions for nickel precipitation using tridecanol ($C_{13}$ alcohol) as hydrogenation inhibitor Stage 1.

The procedure of Example 1, stage 1 is followed except that the organic medium contains 10 volume % tridecanol instead of 10 volume % decanol, and is loaded from 6.3 g/l nickel (as sulphate) solution to give 11.2 g/l nickel in the organic medium.

Stage 2.

The procedure of Example 2, stage 2 is followed giving 97.5% of the nickel precipitated as free powder with carbon content of 0.15%. Reloading of the organic medium according to stage 1 gives a 11.0 g/l nickel solution.

EXAMPLE 7

Shows preferred conditions for cobalt precipitation using nonanol ($C_9$ alcohol) as hydrogenation inhibitor Stage 1.

The procedure of Example 1, stage 1 is followed except that the organic medium contains 10 volume % nonanol instead of 10 volume % decanol, and is loaded to give 6.4 g/l cobalt in the organic medium.

Stage 2.

The procedure of Example 1, stage 2 is followed giving 94.1% of the cobalt precipitated as free powder with carbon content of 0.10%. Reloading of the organic medium according to stage 1 gives a 6.7 g/l cobalt solution.

EXAMPLE 8

Shows preferred conditions for nickel precipitation using octanol ($C_8$ alcohol) as hydrogenation inhibitor Stage 1.

The procedure of Example 1, stage 1 is followed except that the organic medium contains 10 volume % octanol instead of 10 volume % decanol, and is loaded from 6.3 g/l nickel (as sulphate) solution to give 11.5 g/l nickel in the organic medium.

Stage 2.

The procedure of Example 2, stage 2 is followed giving 95.3% of the nickel precipitated as free powder with carbon content of 0.093%. Reloading of the organic medium according to stage 1 gives a 11.6 g/l nickel solution.

EXAMPLE 9

Shows preferred conditions for copper precipitation from LIX 34

Stage 1.

The procedure of Example 1, stage 1 is followed except that the organic medium contains 15 volume % LIX 34 instead of 15 volume % KELEX 100, and is loaded from 4.1 g/l copper (as sulphate) solution to give 7.3 g/l copper in the organic medium.

Stage 2.

The procedure of Example 7, stage 2 is followed except that the loaded organic medium is reacted for 6 hours at 175° C. with 400 p.s.i. hydrogen. After reaction, 92.8% of the copper is precipitated as free powder with carbon content of 0.088%. Reloading of the organic medium according to stage 1 gives a 7.1 g/l copper solution.

COMPARATIVE EXAMPLE A

Shows decomposition when no decanol is added

Stages 1 and 2 of Example 2 are repeated but with no decanol addition, such that the organic medium comprises 15 volume % KELEX 100 and 85 volume % kerosene. At the end of stage 2, 88.5% of the nickel is precipitated as free powder with essentially no plating on internal autoclave surfaces. However, the carbon content of the nickel powder is 0.65%, and attempts to reload the hydrogen stripped organic medium as in stage 1 of Example 2 results in very slow phase separation and an organic medium containing only 6.8 g/l nickel.

COMPARATIVE EXAMPLE B

Shows decomposition when an aromatic alcohol is added

Stages 1 and 2 of Example 2 are repeated, with the exception that the organic medium contains 10 volume % nonyl phenol (the most preferred modifier in conventional acid stripping systems) instead of 10 volume % decanol. At the end of stage 2, 88.5% of the nickel is precipitated as free powder with essentially no plating on internal autoclave surfaces. However, the carbon content of the nickel powder is 0.65%, and attempts to reload the hydrogen stripped organic medium as in stage 1 of Example 2 results in very slow phase separation and an organic medium containing only 6.8 g/l nickel.

COMPARATIVE EXAMPLE C

Shows metal plating when no seed is added

Stages 1 and 2 of Example 2 are repeated, but with no addition of nickel seed to stage 2. At the end of stage 2, 61% of the nickel is plated on internal autoclave surfaces and 21% is precipitated as free powder, with a carbon content of 0.13%. The organic medium is reloaded to give a 11.2 g/l nickel solution.

We claim:

1. A process for the production of cobalt, nickel and copper powders from chelating extractants, which comprises reacting with hydrogen a liquid organic medium containing in solution a quinoline-based chelating extractant having bonded thereto a metal selected from the group consisting of cobalt, nickel and copper, and a hydrogenation inhibitor consisting of a linear or branched aliphatic alcohol containing from 7 to 13 carbon atoms, at a temperature of about 150° to about 350° C. and a pressure of about 50 to about 600 p.s.i. to cause precipitation of the metal in powder form while preventing decomposition of the chelating extractant, said liquid organic medium further containing a seed of the precipitating metal whereby to avoid undesirable deposition of the metal in plated form.

2. A process as claimed in claim 1, wherein said quinoline-based chelating extractant is an 8-hydroxyquinoline substituted in the 7-position with a hydrocarbyl group having from 8 to 17 carbon atoms.

3. A process as claimed in claim 2, wherein said chelating extractant is 7-(4-ethyl-1-methyloctyl)-8-hydroxyquinoline.

4. A process as claimed in claim 2, wherein said chelating extractant is present in an amount of about 5 to about 30% by volume, based on the total volume of said liquid organic medium.

5. A process as claimed in claim 4, wherein said chelating extractant is present in an amount of about 15% by volume.

6. A process as claimed in claim 1, wherein said aliphatic alcohol is present in an amount of about 5 to about 20% by volume, based on the total volume of said liquid organic medium.

7. A process as claimed in claim 6, wherein said aliphatic alcohol is present in an amount of about 10% by volume.

8. A process as claimed in claim 1, wherein said aliphatic alcohol is selected from the group consisting of octanol, nonanol, decanol and tridecanol.

9. A process as claimed in claim 8, wherein said aliphatic alcohol is decanol.

10. A process as claimed in claim 1, wherein said liquid organic medium comprises a hydrocarbon diluent.

11. A process as claimed in claim 10, wherein said hydrocarbon diluent is kerosene.

12. A process as claimed in claim 1, for the production of cobalt powder, wherein use is made of a quinoline-based cobalt chelate and the reaction is carried out at a temperature between 250° and 350° C. and a hydrogen pressure between 100 and 600 p.s.i., in the presence of added cobalt seed.

13. A process as claimed in claim 12, wherein said cobalt chelate is derived from 7-(4-ethyl-1-methyloctyl)-8-hydroxyquinoline and the aliphatic alcohol used as hydrogenation inhibitor is decanol.

14. A process as claimed in claim 1, for the production of nickel powder, wherein use is made of a quinoline-based nickel chelate and the reaction is carried out at a temperature between 230° and 300° C. and a hydrogen pressure between 100 and 600 p.s.i., in the presence of added nickel seed.

15. A process as claimed in claim 14, wherein said nickel chelate is derived from 7-(4-ethyl-1-methyloctyl)-8-hydroxyquinoline and the aliphatic alcohol used as hydrogenation inhibitor is decanol.

16. A process as claimed in claim 1, for the production of copper powder, wherein use is made of a quinoline-based copper chelate and the reaction is carried out at a temperature between 170° and 215° C. and a hydrogen pressure between 50 and 600 p.s.i., in the presence of added copper seed.

17. A process as claimed in claim 16, wherein said copper chelate is derived from 7-(4-ethyl-1-methyloctyl)-8-hydroxyquinoline and the aliphatic alcohol used as hydrogenation inhibitor is decanol.

18. A process as claimed in claim 1, for the separation of cobalt and nickel from a liquid organic medium containing a mixture of quinoline-based cobalt and nickel chelates, wherein said liquid organic medium is first treated with an aqueous acidic stripping solution to provide an aqueous phase containing nickel in dissolved form and an organic phase containing said cobalt chelate, and said organic phase is thereafter reacted with hydrogen at a temperature between 250° and 350° C. and a pressure between 100 and 600 p.s.i., in the presence of said hydrogenation inhibitor and of added cobalt seed, to cause precipitation of cobalt in powder form.

19. A process as claimed in claim 18, wherein said cobalt and nickel chelates are each derived from 7-(4-ethyl-1-methyloctyl)-8-hydroxyquinoline and said hydrogenation inhibitor comprises decanol.

20. A process as claimed in claim 1, further including the step of recycling said chelating extractant after reaction with hydrogen for reloading same with the metal to be precipitated.

* * * * *